(12) United States Patent  
Hansell

(10) Patent No.: US 6,688,417 B2  
(45) Date of Patent: Feb. 10, 2004

(54) AXIAL PISTON UNIT FOR INTEGRATED WHEEL HUB

(75) Inventor: Jeffrey C. Hansell, Overbrook, KS (US)

(73) Assignee: Sauer-Danfoss Inc., Ames, IA (US)

( * ) Notice: Subject to any disclaimer, the term of this patent is extended or adjusted under 35 U.S.C. 154(b) by 107 days.

(21) Appl. No.: 09/973,252

(22) Filed: Oct. 9, 2001

(65) Prior Publication Data

US 2003/0066703 A1 Apr. 10, 2003

(51) Int. Cl.⁷ ............................................. B60K 17/14
(52) U.S. Cl. ........................ 180/305; 180/308; 475/83
(58) Field of Search ................... 180/305, 307, 180/308, 242, 65.5, 24.07; 475/83

(56) References Cited

U.S. PATENT DOCUMENTS

| 3,612,724 | A | | 10/1971 | Smith | |
|---|---|---|---|---|---|
| 3,736,073 | A | | 5/1973 | Walmsley | |
| 4,207,804 | A | * | 6/1980 | Fukui | 91/499 |
| 4,213,514 | A | * | 7/1980 | Ehrlinger et al. | 180/308 |
| 4,271,725 | A | | 6/1981 | Takao et al. | |
| 4,583,425 | A | | 4/1986 | Mann et al. | |
| 4,896,585 | A | | 1/1990 | Forster | |
| 5,107,718 | A | | 4/1992 | Inagawa | |
| 5,123,815 | A | | 6/1992 | Larkin et al. | |
| 5,398,776 | A | * | 3/1995 | Forster | 180/308 |
| 5,431,245 | A | | 7/1995 | Beck et al. | |
| 5,624,340 | A | * | 4/1997 | Forster | 475/72 |
| 5,928,099 | A | | 7/1999 | Tsunemi | |
| 6,135,259 | A | * | 10/2000 | Forster | 192/221.1 |
| 6,248,037 | B1 | * | 6/2001 | Forster | 475/83 |
| 6,260,653 | B1 | * | 7/2001 | Forster | 180/308 |
| 6,290,048 | B1 | * | 9/2001 | Kohlmeier et al. | 192/221.1 |
| 6,334,512 | B1 | * | 1/2002 | Forster | 188/71.5 |
| 6,443,290 | B1 | * | 9/2002 | Forster | 192/221.1 |
| 6,447,420 | B1 | * | 9/2002 | Tanabe et al. | 475/83 |

FOREIGN PATENT DOCUMENTS

JP          6-11014       *  1/1994

OTHER PUBLICATIONS

Torque–Hub® Planetary Final Drives Product Guide CT & CW Series, Fairfield Manufacturing Company, Inc., Lafayette, IN 47903–7940 USA, © 2001.

* cited by examiner

Primary Examiner—Brian L. Johnson  
Assistant Examiner—Christopher Bottorff

(57) ABSTRACT

An integrated wheel hub assembly includes a hydrostatic spindle assembly that has a spindle with a hydrostatic rotational power unit and integral high-pressure passageways therein, a wheel hub rotatably supported by the spindle assembly, and an axle shaft extending through the spindle for transmitting power from the hydrostatic unit to the wheel hub through a planetary gear set reducer. For radial compactness, the swashplate of the hydrostatic power unit resides outside the wheel hub.

15 Claims, 3 Drawing Sheets

AXIAL PISTON UNIT FOR INTEGRATED WHEEL HUB

BACKGROUND OF THE INVENTION

The present invention relates to the field of integrated wheel hubs that combine hydraulic rotational power units with mechanical gear drive components such as planetary gear set reducers. More particularly, the invention relates to a novel compact arrangement of a hydrostatic rotational power unit within an integrated wheel hub.

The conventional approach to construction of integrated wheel hubs has been to locate the swashplate of the hydrostatic rotational power unit or axial piston unit deep within a large cavity formed in the stationary spindle. The spindle in turn is deeply buried in and rotatably supports the rotating wheel hub of the integrated wheel hub with the aid of appropriate bearings located between the inside of the wheel hub and the outside of the spindle. The cylinder block and piston assemblies of the hydrostatic unit reside in the cavity between the swashplate and the main opening of the cavity. A separate end cap portion with appropriate high-pressure ports therein for the hydrostatic unit then bolts to the assembly in covering relation to the rear of the cylinder block and the spindle cavity.

While this conventional arrangement provides compactness in a longitudinal or axial direction, it is not particularly compact radially. The surrounding spindle, wheel hub, and bearing structure must be quite large to accommodate the rather bulky swashplate portion of the hydrostatic unit. Furthermore, in some applications where a variable displacement hydrostatic motor would be useful, there is not enough space within the inner diameter of the spindle bearing to position and assemble the swashplate and servo system of the variable displacement hydrostatic unit. There is a need for an integrated wheel hub that is both radially and axially compact, yet able to accommodate a variable displacement hydrostatic unit.

Therefore, a primary objective of the present invention is provision of an improved integrated wheel hub assembly.

A further objective of the present invention is the provision of an axial piston unit for an integrated wheel hub.

A further objective of the present invention is the provision of an improved integrated wheel hub spindle assembly that includes therewithin a hydrostatic rotational power unit.

A further objective of the present invention is the provision of an improved integrated wheel hub spindle that includes high-pressure passageways therein for a hydrostatic unit.

A further objective of the present invention is the provision of an integrated wheel hub assembly that includes few components and utilizes a single main axle shaft.

A further objective of the present invention is the provision of an integrated wheel hub assembly that is easy to assemble and service.

A further objective of the present invention is the provision of a radially compact integrated wheel hub assembly.

A further objective of the present invention is the provision of an integrated wheel hub assembly that is economical to produce, durable, and reliable in use.

These and other objectives will be apparent from the drawings, as well as from the description and claims that follow.

SUMMARY OF THE INVENTION

The present invention relates to the field of integrated wheel hub assemblies that combine a hydrostatic rotational power unit with a wheel hub and planetary gear set. The present invention provides unique spindle and cover members that allow the hydrostatic unit to be oriented in a novel compact way within an integrated wheel hub assembly.

The integrated wheel hub assembly of this invention includes a spindle with high-pressure passages and a cavity therein that houses the cylinder block of a hydrostatic rotational power unit, a wheel hub rotatably mounted on the spindle, and an axle shaft extending through the spindle for transmitting power from the hydrostatic rotational power unit to the wheel hub through a planetary gear set reducer. The swashplate of the hydrostatic rotational power unit, which is typically the bulkiest portion of the hydrostatic unit, resides outside the confines of the wheel hub and the bearings that support the wheel hub on the spindle. This allows the spindle, wheel hub and bearings to be much smaller in diameter, which represents a considerable cost savings. The spindle with high-pressure passageways therein eliminates the need for a separate end cap.

DETAILED DESCRIPTION OF THE PREFERRED EMBODIMENTS

Figure 1:
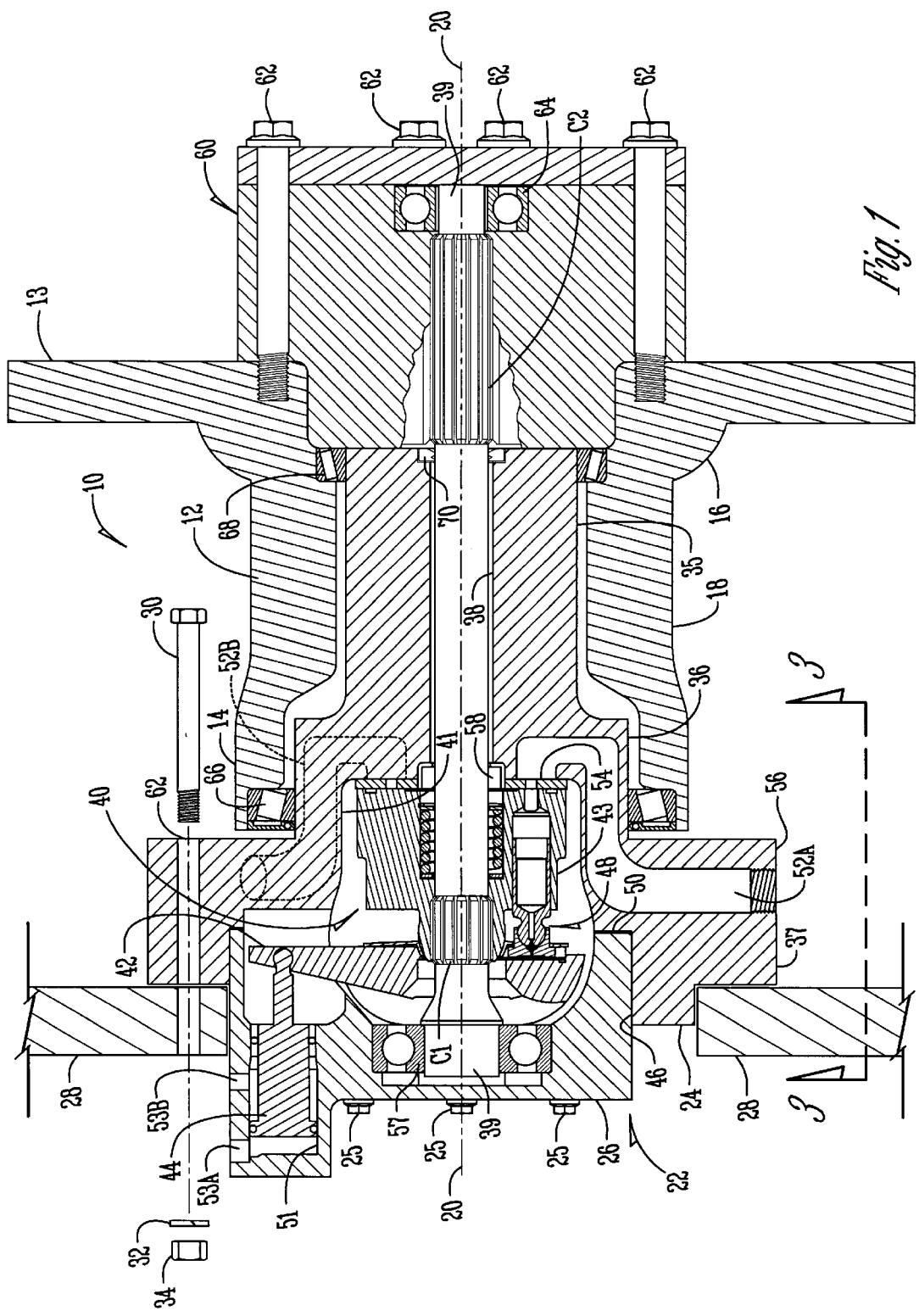
FIG. 1 is a sectional view of the integrated wheel hub assembly of this invention taken along the axis of rotation of the wheel hub, except that for simplicity the axle shaft and fasteners are not shown in cross-section and the planetary gear set reducer is shown in simplified form.

In FIG. 1, the integrated wheel hub assembly of the present invention is generally designated by the reference numeral 10. The wheel hub assembly 10 includes a wheel hub 12 that has an outwardly directed flange 13 for the conventional mounting of a vehicle wheel (not shown) thereto. The wheel hub 12 has inboard and outboard side portions 14, 16, and an open or hollow center portion 18 with a central axis of rotation 20. Since wheel hub assemblies can be provided for wheels on either side of a vehicle and on either side of the driven wheel, the terms "inboard" and "outboard" are used herein to identify features that are located farther away from or closer to the driven wheel respectively. Similarly, an inboard or inward direction extends away from the wheel, while an outboard or outward direction extends toward the wheel.

Figure 2:
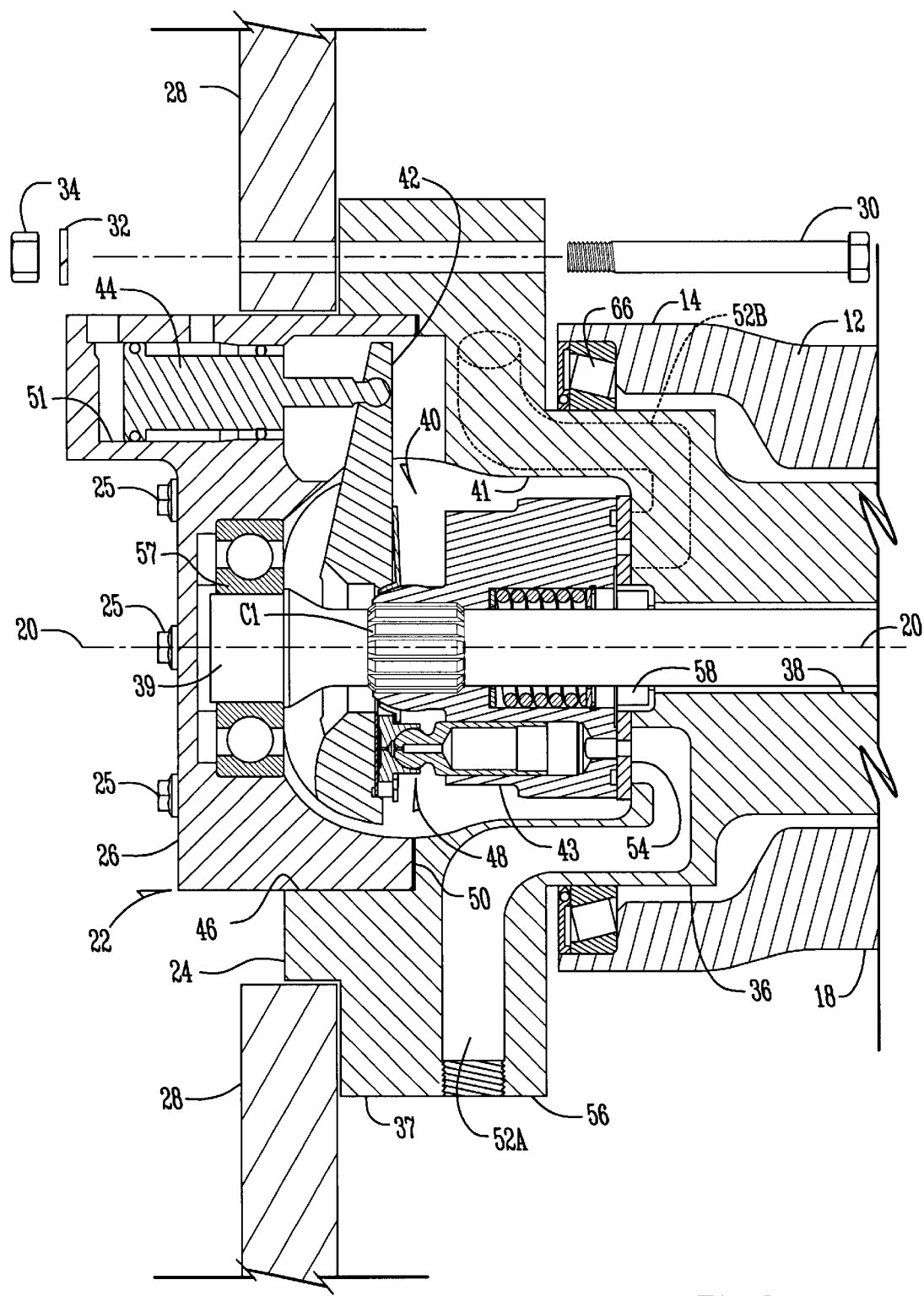
FIG. 2 is an enlargement of the left-hand portion of FIG. 1 and shows the unique spindle housing, inner cover, and placement of the hydrostatic components of the present invention.

Referring to FIGS. 1 and 2, the wheel hub assembly 10 has a spindle assembly 22 that includes an elongated spindle 24 and a cover 26 attached to the spindle 24 by conventional fasteners 25. The spindle assembly 22 is stationary and is preferably secured to the vehicle frame 28 in several angularly spaced locations by fastening means, such as bolt 30, washer 32, and nut 34 for example. The spindle 24 is substantially cylindrical and has an outboard end portion 35, an optional intermediate portion 36, and an inboard end portion 37. The outer diameter of at least the outboard end portion 35 is small enough to be inserted into the open center portion 18 of the wheel hub 12. More preferably for greater axial compactness, the outer diameter of the intermediate portion 36 (when present) is also small enough to be inserted into the open center portion 18 of the wheel hub 12.

The spindle 24 includes an elongated central bore 38 extending axially therethrough. The bore 38 slidably receives an elongated axle shaft 39 that is coaxial with the axis 20 when the wheel hub assembly 10 is complete. The axle shaft 39 has coupling means C1 and C2 thereon, such as the splines shown. Of course, other coupling means, including but not limited to keys, keyways, and drive pins, could be used without detracting from the invention.

The inboard end portion 37 of the spindle 24 has a cavity 41 formed therein for receiving a hydrostatic rotational power unit 40. The hydrostatic rotational power unit 40 is preferably a variable displacement axial piston motor. The power unit 40 includes a pivotal swashplate 42 with a servo piston 44 drivingly connected thereto for pivoting the swashplate 42 to vary the hydrostatic power to be imparted to the hydrostatic rotational power unit 40. The swashplate 42 establishes the fluid displacement (consumption) of the power unit 40 (motor). The power unit 40 has a cylinder block 43 with a plurality of axially reciprocal piston and slipper assemblies 48 therein. The cylinder block 43 has coupling means thereon for matingly engaging the coupling means C1 on the axle shaft 39. An enlarged area or counterbore 46 exists at the mouth of the cavity 41 to accommodate the swashplate 42.

The cover 26 detachably attaches with angularly spaced fasteners 25 and conventional sealing means 50, such as a gasket, an O-ring or the like, to the inboard end portion 37 of the spindle 24 and contains the hydrostatic rotational power unit 40 in the cavity 41. The cover 26 has a servo bore 51 therein that houses the servo piston 44. The servo piston 44 has a ball end thereon that swivelingly and drivingly engages a mating socket on the swashplate 42. Servo control ports 53A, 53B extend into the servo bore 51. The cover 26 journals the swashplate 42 and rotatably supports the inboard portion of the shaft 39 with the assistance of bearing means 57. As best seen in FIG. 2, the cover 26 has suitable recesses formed in its outboard side to allow the servo piston 44 to extend and the swashplate 42 to pivot.

Figure 3:
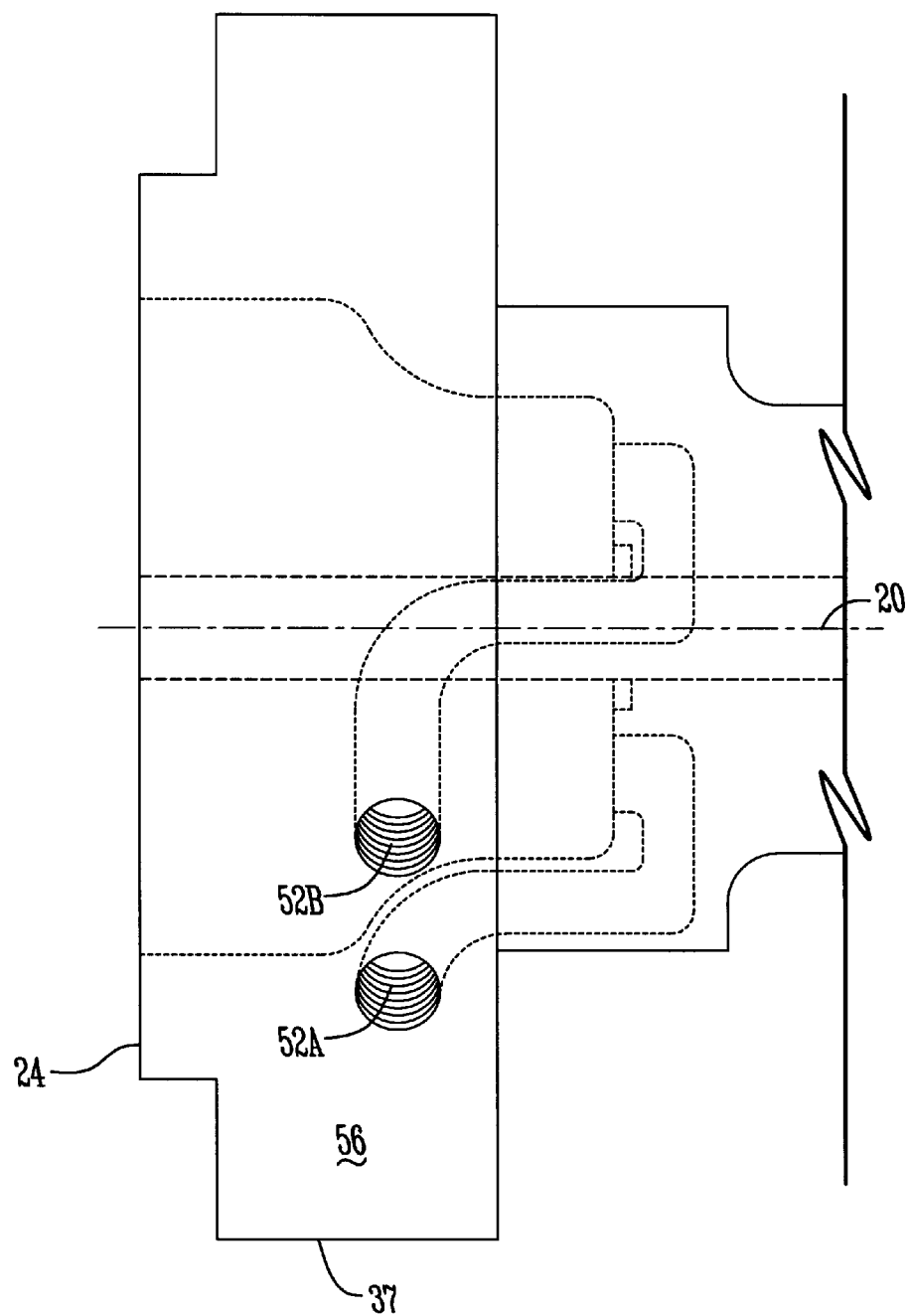
FIG. 3 is a partial plan view of the bottom of the spindle taken along line 3—3 in FIG. 1 and shows alternative locations for the high-pressure passageways.

The spindle 24 has a pair of spaced apart high-pressure hydraulic passageways 52A, 52B, for receiving hydraulic power in the form of pressurized fluid from a conventional pressure source such as a pump (not shown). The passages 52A, 52B are in fluid communication with the cylinder block 43 and piston and slipper assemblies 48 of the hydrostatic power unit 40 through a valve plate 54 to operate the power unit 40 in a known manner. However, the passageways 52A, 52B are preferably formed integrally with the spindle 24 in a conventional shell core casting process. Lost foam or other types conventional casting processes may also be utilized. The passageways 52A, 52B exit the spindle 24 at angularly spaced locations along the outer surface 56 of the inboard portion 37 as shown. Of course, departure at other locations is possible without detracting from the invention. For example in an alternative embodiment illustrated in FIG. 3, the passageways 52A, 52B can be located on the same side of the spindle 24 and wrap around the axle shaft 39 to reach the hydrostatic power unit 40.

A planetary gear set reduction means 60 drivingly fastens to the outer side portion 16 of the wheel hub 12 with a plurality of fasteners 62. Planetary gear sets are well known and are not the subject of this invention. Therefore, most of the internal components of the planetary means are omitted from the figures. The coupling means C2 on the axle shaft 39 matingly and drivingly engages the sun gear of the planetary gear set. Bearing means 64 supports the outboard end of the axle shaft 39 in the planetary means 60.

The wheel hub 12 is rotatably journaled on the spindle 24 by a pair of spaced apart thrust bearings 66, 68 that operatively opposed each other as shown. In the preferred embodiment, the thrust bearing 66 is a sealed bearing located between the wheel hub 12 and the intermediate portion 36 of the spindle 24, while the thrust bearing 68 is unsealed and located between the wheel hub 12 and the outboard portion 35 of the spindle 24. The sealed nature of the bearings 66, 68 could be reversed and the bearings 66, 68 could both reside on the same portion of the spindle 24, if sufficient space were provided, without detracting from the invention.

A lip seal 70 mounts in the spindle 24 around the axle shaft 39 outboard of the hydrostatic unit 40. The seal 70 keeps the oil of the contaminate-sensitive hydrostatic unit 40 separate from the lubricating oil in the planetary means 60. A bearing 58 preferably a needle bearing, rotatably supports the intermediate portion of the shaft 39 in the spindle 24.

In operation, a pump supplies the hydrostatic rotational power unit 40 integrated wheel hub assembly 10 with pressurized fluid through one of the high-pressure fluid passageways 52A, 52B. When the operator uses a conventional control device to send hydraulic command signals to the servo piston 44 through the ports 53A, 53B, the swashplate 42 tilts or pivots from the neutral position shown in FIG. 1. The swashplate 42 inclines with respect to the piston and slipper assemblies 48. As is well known in the hydrostatic field, this causes the cylinder block 43 of the hydrostatic unit 40 to rotate the axle shaft 39 at a given speed and torque in a given direction in response to the pressurized fluid entering through one of the passageways 52A, 52B and being exhausted through the other of the passageways 52A, 52B. The shaft 39 turns the planetary gear set 60, which in turn has a ring gear (not shown) that causes the wheel hub 12 to rotate at a given speed and torque on the stationary spindle assembly 22 based upon the gear ratio.

Although multiple-piece shafts could be used, the present invention advantageously utilizes a single main axle shaft 39 on the axis of rotation 20 for the entire wheel hub assembly 10. Separate main shafts are not required for the hydrostatic unit 40 and the planetary gear set 60. Inclusion of the high-pressure passageways 52A, 52B integral to the spindle 24 eliminates the need for a separate end cap for the hydrostatic unit 40. Removing the swashplate 42 (and servo piston 44, if present) from the confines of the wheel hub 12 provides a more radially compact integrated wheel hub assembly 10.

Therefore, it can be seen that the present invention at least satisfies its stated objectives.

In the drawings and specifications, there has been set forth a preferred embodiment invention, and although specific terms are employed, these are used in a generic and descriptive sense only and not for purposes of limitation. Changes in the form and proportion of parts as well as in the substitution of equivalents are contemplated as circumstances may suggest or render expedient without departing from the scope of the invention as defined in the following claims.

What is claimed is:

1. An axial piston unit for an integrated wheel hub, comprising:

a wheel hub having inboard and outboard side portions, and an open center portion with an axis of rotation, a spindle assembly including a spindle extending within the center portion of the wheel hub, the spindle extending from the center portion of the wheel hub in an inboard direction, the spindle assembly including a hydrostatic rotational power unit and comprising a pivotal swashplate and a servo piston for pivoting the swashplate to vary the hydrostatic power to be imparted to the hydrostatic rotational power unit, an axle shaft extending through the spindle and being connected to the wheel hub and the hydrostatic rotational power unit, for rotation of the wheel hub from rotational power of the hydrostatic rotational power unit, the swashplate being positioned beyond the confines of the center portion of the wheel hub in the inboard direction therefrom, hydraulic passageways in the spindle to provide pressurized fluid to the hydrostatic rotational power unit, and the axle shaft extending through the swashplate.

2. The wheel hub assembly of claim 1 wherein the spindle has an outboard end portion disposed within the center portion of the wheel hub and the center portion of the wheel hub is rotatably supported on the outboard end portion of the spindle by bearing means.

3. The wheel hub assembly of claim 2 wherein the spindle has an inboard end portion axially spaced from the wheel hub in the inboard direction and the inboard end portion of the spindle has a cavity therein for receiving a portion of the hydrostatic rotational power unit.

4. The wheel hub assembly of claim 3 wherein the hydrostatic rotational power unit includes a cylinder block and the hydraulic passages in the spindle are a pair of spaced apart hydraulic passages that enter the inboard end portion of the spindle and are in fluid communication with the cylinder block of the hydrostatic rotational power unit.

5. The wheel hub assembly of claim 3 comprising a cover detachably mounted to the inboard end portion of the spindle so as to cover the cavity.

6. The wheel hub assembly of claim 5 wherein the cover has a servo bore therein for slidably housing the servo piston.

7. The wheel hub assembly of claim 5 wherein the cover has a bore therein for rotatably supporting the axle shaft.

8. The wheel hub assembly of claim 1 wherein the spindle assembly is stationary.

9. The wheel hub assembly of claim 1 wherein the axle shaft extends through the spindle and wheel hub on the axis of rotation with an uninterrupted longitudinal cross section.

10. A hydrostatic spindle assembly for an integrated wheel hub assembly comprising:

an elongated spindle having a bore extending longitudinally therethrough and including opposite inboard and outboard end portions, the inboard end portion having a longitudinal cavity formed therein intersecting the bore, the inboard end portion being adapted to be secured to a frame of a vehicle;

the spindle including a hydrostatic rotational power unit disposed in the cavity and comprising a pivotal swashplate and a servo piston for pivoting the swashplate to vary the hydrostatic power to be imparted to the hydrostatic rotational power unit;

a cover detachably attached to the inboard end portion of the spindle so as to cover the cavity and hold the hydrostatic rotational power unit within the spindle assembly;

an axle shaft rotatably supported by the cover, the axle shaft extending through the bore of the spindle and being coupled for rotation with the hydrostatic rotational power unit;

the inboard end portion of the spindle including hydraulic passageways therein for communicating pressurized hydraulic fluid to the hydrostatic rotational power unit; and the axle shaft extending through the swashplate.

11. The spindle assembly of claim 10 comprising a swashplate disposed within the cavity for establishing the fluid displacement or consumption of the hydrostatic rotational power unit.

12. The spindle assembly of claim 11 wherein the swashplate is pivotally mounted in a recess in the cover.

13. The spindle assembly of claim 12 wherein the cover has a servo bore therein and the spindle assembly comprises a servo piston slidably mounted in the servo bore and engaging the swashplate so as to pivot the swashplate and thereby vary the fluid displacement or consumption of the hydrostatic rotational power unit.

14. The spindle assembly of claim 10 wherein the cavity has a bottom wall and the hydrostatic rotational power unit includes a swashplate and a cylinder block at least partially disposed in the spindle, the cylinder block being located between the swashplate and the bottom wall of the cavity.

15. The spindle assembly of claim 14 wherein the cover has a servo bore therein and the spindle assembly comprises a servo piston slidably mounted in the servo bore and engaging the swashplate so as to pivot the swashplate and thereby vary the fluid displacement or consumption of the hydrostatic rotational power unit.

\* \* \* \* \*